(12) United States Patent
Wakabayashi

(10) Patent No.: US 7,766,563 B2
(45) Date of Patent: Aug. 3, 2010

(54) SHUTTER DEVICE AND IMAGE-CAPTURING DEVICE

(75) Inventor: Tsutomu Wakabayashi, Yokohama (JP)

(73) Assignee: Nikon Corporation, Tokyo (JP)

( * ) Notice: Subject to any disclaimer, the term of this patent is extended or adjusted under 35 U.S.C. 154(b) by 223 days.

(21) Appl. No.: 11/882,445

(22) Filed: Aug. 1, 2007

(65) Prior Publication Data

US 2008/0031615 A1  Feb. 7, 2008

(30) Foreign Application Priority Data

Aug. 3, 2006 (JP) .............................. 2006-212286

(51) Int. Cl.
*G03B 9/40* (2006.01)
(52) U.S. Cl. ...................................... 396/486
(58) Field of Classification Search ......... 396/483–484, 396/486
See application file for complete search history.

(56) References Cited

U.S. PATENT DOCUMENTS 3,940,780 A * 2/1976 Sato ........................... 396/479
3,984,854 A * 10/1976 Wolcott ....................... 396/535
5,159,371 A 10/1992 Fukuda
5,493,356 A * 2/1996 Tokui ........................ 396/435
2002/0172519 A1 11/2002 Takahashi et al.

FOREIGN PATENT DOCUMENTS

| JP | 01-289928 | | 11/1989 |
| JP | 06175206 A | * | 6/1994 |
| JP | 8-69029 | | 3/1996 |

OTHER PUBLICATIONS

Extended European Search Report issued in corresponding European Patent Application No. 07113673.3, on Nov. 20, 2007.

* cited by examiner

*Primary Examiner*—Christopher E Mahoney
*Assistant Examiner*—Leon W Rhodes

(57) ABSTRACT

A shutter device includes: a base plate having a photographic aperture and a front surface and a rear surface; a shutter blade group that closes and opens the photographic aperture to light; a rear cover having an opening portion that corresponds to the photographic aperture, provided to the rear surface of the base plate with the shutter blade group between the rear cover and the rear surface of the base plate, and having a front surface and a rear surface; and a reflection prevention member fitted to the rear surface of the rear cover.

7 Claims, 6 Drawing Sheets

SHUTTER DEVICE AND IMAGE-CAPTURING DEVICE

INCORPORATION BY REFERENCE

The disclosure of the following priority application is herein incorporated by reference:

Japanese Patent Application No. 2006-212286, filed Aug. 3, 2006.

BACKGROUND OF THE INVENTION

1. Field of the Invention

The present invention relates to a shutter device that is used in an image-capturing device that captures an image of a photographic subject with an image sensor, and to an image-capturing device that employs this shutter device.

2. Description of Related Art

A shutter device in which the base plate of a focal plane shutter (the shutter base plate) is made from resin is per se known. With this shutter device, in order to prevent harmful reflection of light by the edge surfaces of the aperture during image capture, minute concavities and convexities are provided upon the edge surfaces of the aperture (refer to Japanese Laid-Open Patent Publication H01-289928).

SUMMARY OF THE INVENTION

However, with this prior art shutter device, although it is possible to prevent reflection of light by the edge surfaces of the aperture, it is not possible to prevent harmful light reflection generated by light that is briefly reflected by a cover glass of the image sensor, or by a cover glass of an optical filter that is provided to the front surface of the image sensor, striking the shutter base plate, or a cover plate of the shutter base plate or the like.

According to the 1st aspect of the present invention, a shutter device comprises: a base plate having a photographic aperture and a front surface and a rear surface; a shutter blade group that closes and opens the photographic aperture to light; a rear cover having an opening portion that corresponds to the photographic aperture, provided to the rear surface of the base plate with the shutter blade group between the rear cover and the rear surface of the base plate, and having a front surface and a rear surface; and a reflection prevention member fitted to the rear surface of the rear cover.

According to the 2nd aspect of the present invention, in the shutter device according to the 1st aspect, it is preferred that the reflection prevention member is a thin plate made from metal, upon a surface of which reflection prevention processing has been performed.

According to the 3rd aspect of the present invention, in the shutter device according to the 1st or the 2nd aspect, it is preferred that: the opening portion is formed in an approximately rectangular shape; and the reflection prevention member is fitted, at least, to long sides of the opening portion.

According to the 4th aspect of the present invention, in the shutter device according to the 3rd aspect, it is preferred that: the opening portion is a larger aperture than the photographic aperture; and edges of the reflection prevention member project to the interior of the opening portion, so as to define an aperture that is smaller than the aperture of the opening portion.

According to the 5th aspect of the present invention, in the shutter device according to any one of the 1st through 4th aspects, it is preferred that: a concave portion is provided upon the rear surface of the rear cover, and is formed as more concave towards the front surface of the rear cover than a surrounding portion of the rear surface of the rear cover; and the reflection prevention member is fitted in the concave portion.

According to the 6th aspect of the present invention, an image-capturing device comprises: an image sensor; a base plate provided in front of the image sensor, and having a photographic aperture through which light from a photographic subject passes towards the image sensor; a shutter blade group that closes and opens the photographic aperture to light; a rear cover having an opening portion that corresponds to the photographic aperture, provided to a surface of the base plate on a side of the image sensor; and a reflection prevention member fitted to a surface of the rear cover on a side that faces the image sensor.

BRIEF DESCRIPTION OF THE DRAWINGS

FIG. 6A shows the external shape of the thin plate 6 as explained in the fundamental embodiment, and FIG. 6B shows this shape in a variant embodiment.

DESCRIPTION OF THE PREFERRED EMBODIMENTS

Figure 1:
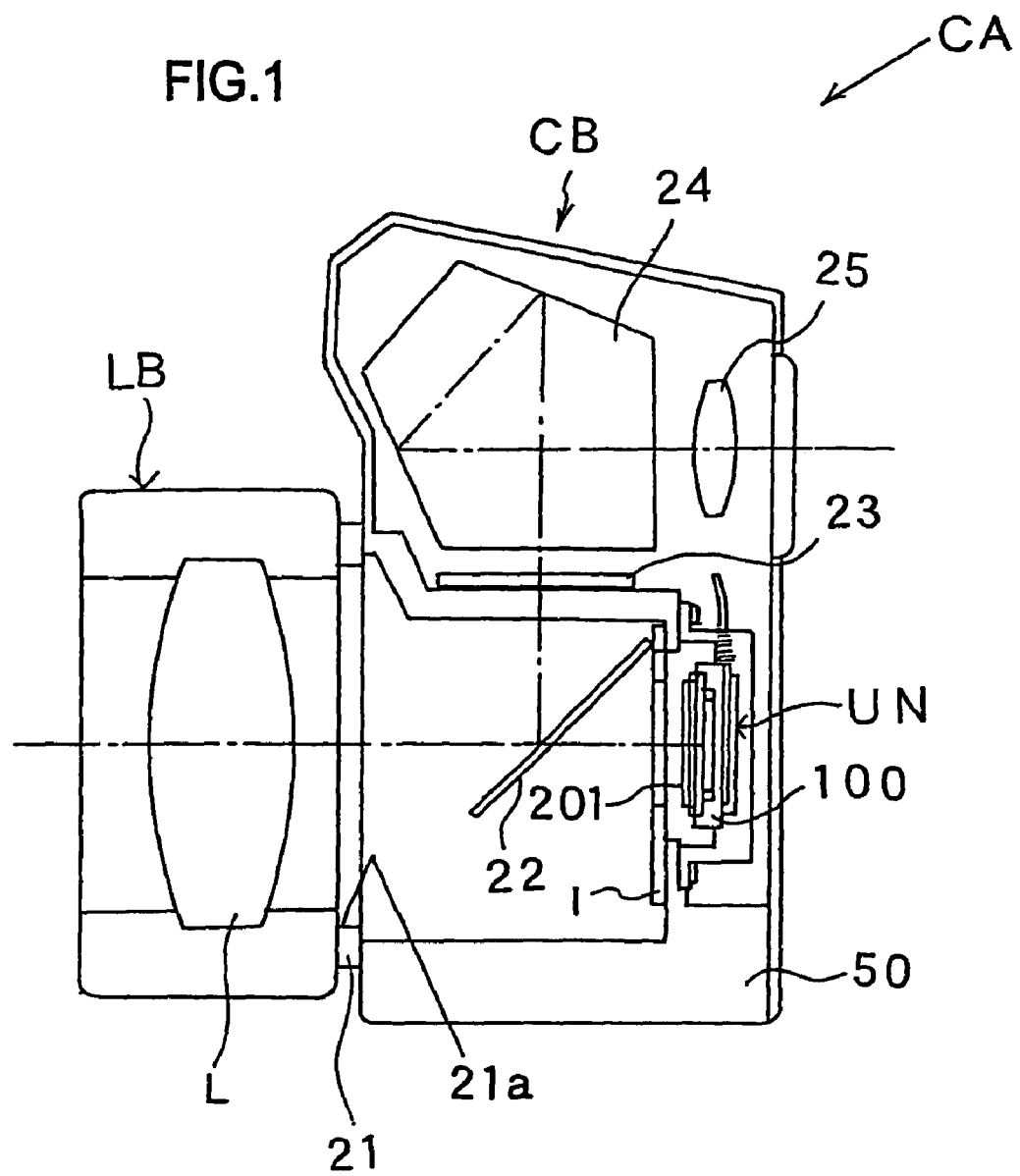
FIG. 1 is a sectional view of a digital still camera CA as seen from the side.

An embodiment in which the shutter device and the image-capturing device according to the present invention are applied to an electronic camera will now be explained with reference to FIGS. 1 through 5. FIG. 1 is a sectional view of this digital still camera as seen from the side. This digital still camera CA is a single lens reflex type camera with interchangeable lens, and an interchangeable lens LB that includes a photographic lens L is mounted to the camera main body CB via a lens mount 21. A photographic light flux (ray bundle) that has passed through the photographic lens L is conducted into the camera main body CB via an aperture 21a of the lens mount 21, is reflected by a mirror 22 and imaged upon a viewfinder screen 23, and then is observed via a penta prism 24 and an eyepiece lens 25.

When actuation for shutter release is performed, the mirror 22 is lifted upwards so as to be removed from the photographic optical path, and then a focal plane shutter 1, that is a shutter device, is driven, so that the light flux transmitted through the photographic lens L is incident upon an image sensor 100 such as a CCD or the like via an optical filter 201. The photoelectric conversion output of the image sensor 100 is subjected to various types of processing by an image processing circuit not shown in the figures, and digital image data is generated. The image sensor 100 and the filter 201 are integrated together in advance as an image capture unit UN. It should be understood that it would also be acceptable to use some other type of image sensor other than a CCD (for example a CMOS) as the image sensor 100.

Figure 2:
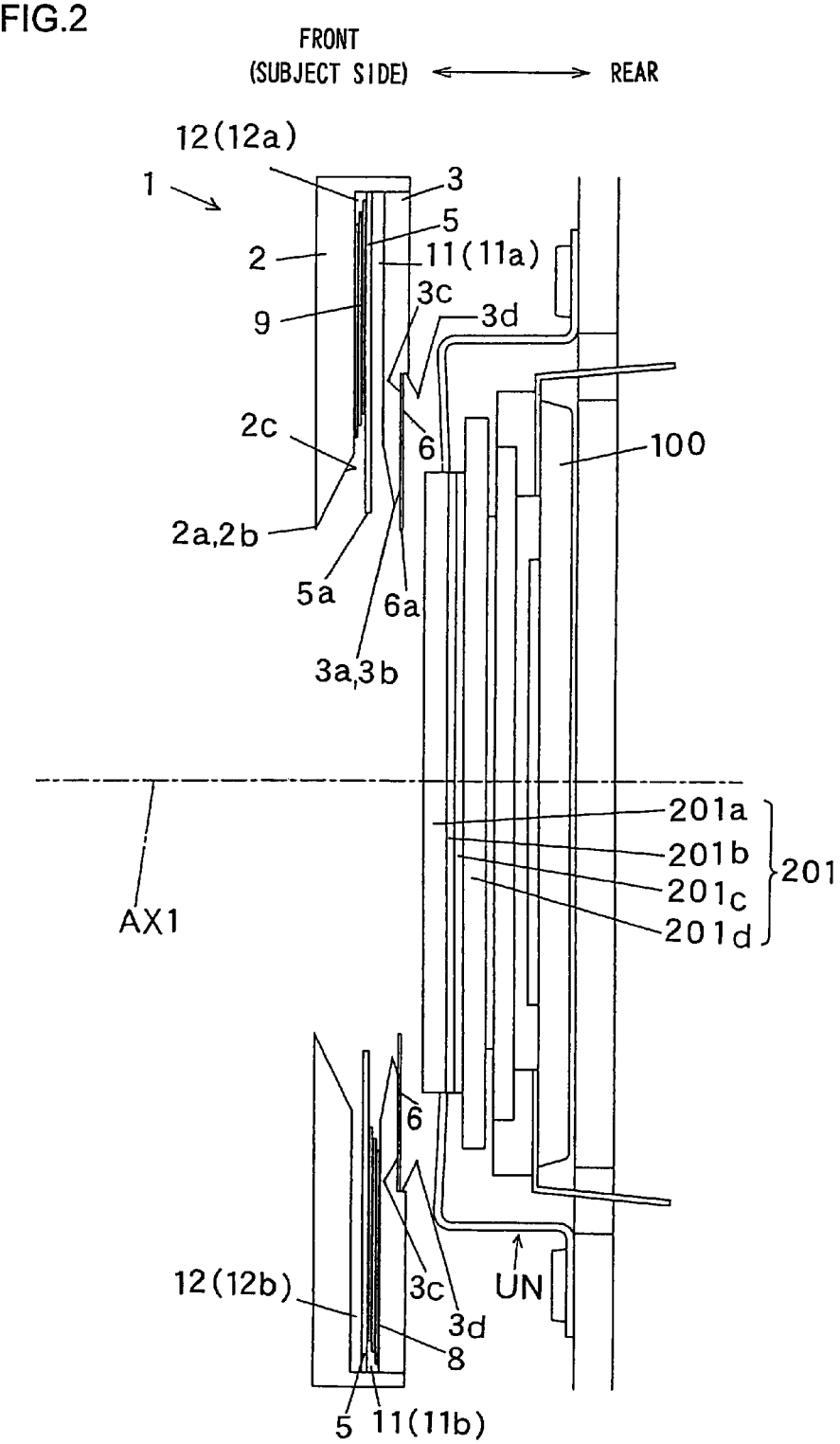
FIG. 2 is a sectional view of a focal plane shutter 1 and its vicinity, as seen from the side of the camera.

FIG. 2 is a sectional view of the focal plane shutter 1 and its vicinity, as seen from the side of the camera. The filter 201 and the image sensor 100 are provided after the focal plane shutter 1, in that order along the optical axis of incidence AX1 from the front (i.e. the side of the photographic subject). The focal plane shutter 1 includes a base plate 2, a rear cover 3, a partition plate 5, a thin plate 6, a front (leading) curtain shutter blade group 8, and a rear (trailing) curtain shutter blade group 9.

The base plate 2 is a base plate upon that the various components that make up the focal plane shutter 1 are disposed, and is made from a synthetic resin. A photographic aperture 2a is provided near the center of this base plate 2, and allows the passage of light to the image sensor 100 so as to create an image of the photographic subject. When light is reflected (diffuse reflection) from the edge surfaces of the base plate 2 that define the photographic aperture 2a, this reflected light is incident upon the image sensor 100 and causes undesirable deterioration of the picture quality of the resultant image. In order to prevent this harmful reflection of light, the photographic aperture 2a is defined by edge portions 2b that are formed as sharp edges. In other words, sloping surfaces 2c are provided that slope so that the size of the aperture becomes smaller from the rear surface of the base plate 2 towards its front surface, and the sharp edge portions 2b are defined by the intersections of these sloping surfaces 2c and the front surface of the base plate 2. The photographic aperture 2a is formed in an approximately rectangular shape, and its dimension in the left-right direction (the direction perpendicular to the drawing paper in FIG. 2) is longer than its dimension in the up-down direction (the vertical direction upon the drawing paper in FIG. 2).

The rear cover 3 is a plate shaped member that is provided at the rear surface side of the base plate 2, and is made from synthetic resin. An opening portion 3a is provided in the vicinity of the center of this rear cover 3. Just as in the case of the base plate 2, the opening portion 3a is defined by edge portions 3b that are formed as sharp edges, in order to prevent harmful reflection of light at the edge surfaces that define this opening portion 3a. The opening portion 3a is formed so as to be a larger aperture than the photographic aperture 2a. A depressed portion 3c is formed upon the rear surface of the rear cover 3, at the upper and lower outer edge vicinity of the opening portion 3a, more depressed towards the front surface of the cover than the surrounding surface, and a thin plate 6 is fitted into this depressed portion 3c.

This thin plate 6, that will be described in more detail hereinafter, is a reflection prevention member whose surface has been subjected to reflection prevention processing such as, for example, painting with matte black paint, and is made from thin metal plate in an approximately rectangular shape. And an opening portion 6a is provided in the vicinity of the center of this thin plate 6. The shape and size of this opening portion 6a are approximately equal to those of the photographic aperture 2a. When the thin plate 6 is fitted in the depressed portion 3c, the position of its opening portion 6a seen along the incident optical axis AX1 coincides with the position of the photographic aperture 2a. In other words, as shown in FIG. 2, the edge portions of the thin plate 6 project more towards the interior of the opening portion 3a of the rear cover 3, than do the edge portions 3b of the opening portion 3a.

It should be understood that, when this thin plate 6 is being fitted to the depressed portion 3c, the thin plate 6 is positioned with respect to the rear cover 3 by the outer edge portion of the thin plate 6 being contacted against the step portion 3d between the depressed portion 3c and the area around the depressed portion 3c. Since the thickness of the thin plate 6 is extremely low, accordingly the edge surface of the opening portion 6a is effectively formed as a sharp edge, so that, together with the reflection prevention processing, it is possible to prevent harmful reflections of light such as described above. It is appropriate to perform the fixing of the thin plate 6 into the depressed portion 3c with adhesive, or using thin double sided adhesive tape, so as to adhere the thin plate 6 into the depressed portion 3c.

The partition plate 5 is a plate shaped member that is disposed between the rear surface of the base plate 2 and the front surface of the rear cover 3, and is formed with an aperture 5a that is larger than the photographic aperture 2a. In the space between the partition plate 5 and the rear surface of the base plate 2, along the upper and lower sides of the photographic aperture 2a, there are provided an upper rear blade chamber 12a and a lower rear blade chamber 12b that house the rear curtain shutter blade group 9. The combination of this upper rear blade chamber 12a and lower rear blade chamber 12b will also sometimes simply be termed the rear blade chamber 12. And, in the space between the partition plate 5 and the front surface of the rear cover 3, along the upper and lower sides of the photographic aperture 2a, there are provided an upper front blade chamber 11a and a lower front blade chamber 11b that house the front curtain shutter blade group 8. The combination of this upper front blade chamber 11a and lower front blade chamber 11b will also sometimes simply be termed the front blade chamber 11.

The front curtain shutter blade group 8 and the rear curtain shutter blade group 9 run across behind the photographic aperture 2, in the vertical direction of the photographic aperture 2, and thereby either close the photographic aperture 2a against the light or open it to the light. Before shutter release, the front curtain shutter blade group 8 closes the photographic aperture 2a against the light, and the rear curtain shutter blade group 9 is housed in the upper rear blade chamber 12a. When a shutter release button not shown in the figures is pressed, the front curtain shutter blade group 8 runs in the downward direction in the figure, and opens the photographic aperture 2a to the light. And, after a predetermined time period has elapsed from the start of running of the front curtain shutter blade group 8, the rear curtain shutter blade group 9 starts to run in the downward direction in the figure, and thereby closes the photographic aperture 2a against the light. It should be understood that in FIG. 2, for the convenience of explanation, the front curtain shutter blade group 8 is shown as being housed in the lower front blade chamber 11b, while the rear curtain shutter blade group 9 is shown as being housed in the upper rear blade chamber 12a, so that the photographic aperture 2a is in the open state.

The filter 201 functions as an infrared cut filter that cuts out infrared light, and it is a filter that also serves a function as a low pass filter for prevention of moire patterning. This filter 201 is an infrared cut low pass filter of a four layer construction and includes, in order from the front, a birefringent plate 201a, an infrared ray cut-out glass plate 201b, a phase plate 201c, and a birefringent plate 201d.

Concerning Light Reflection by this Focal Plane Shutter 1

Figure 3:
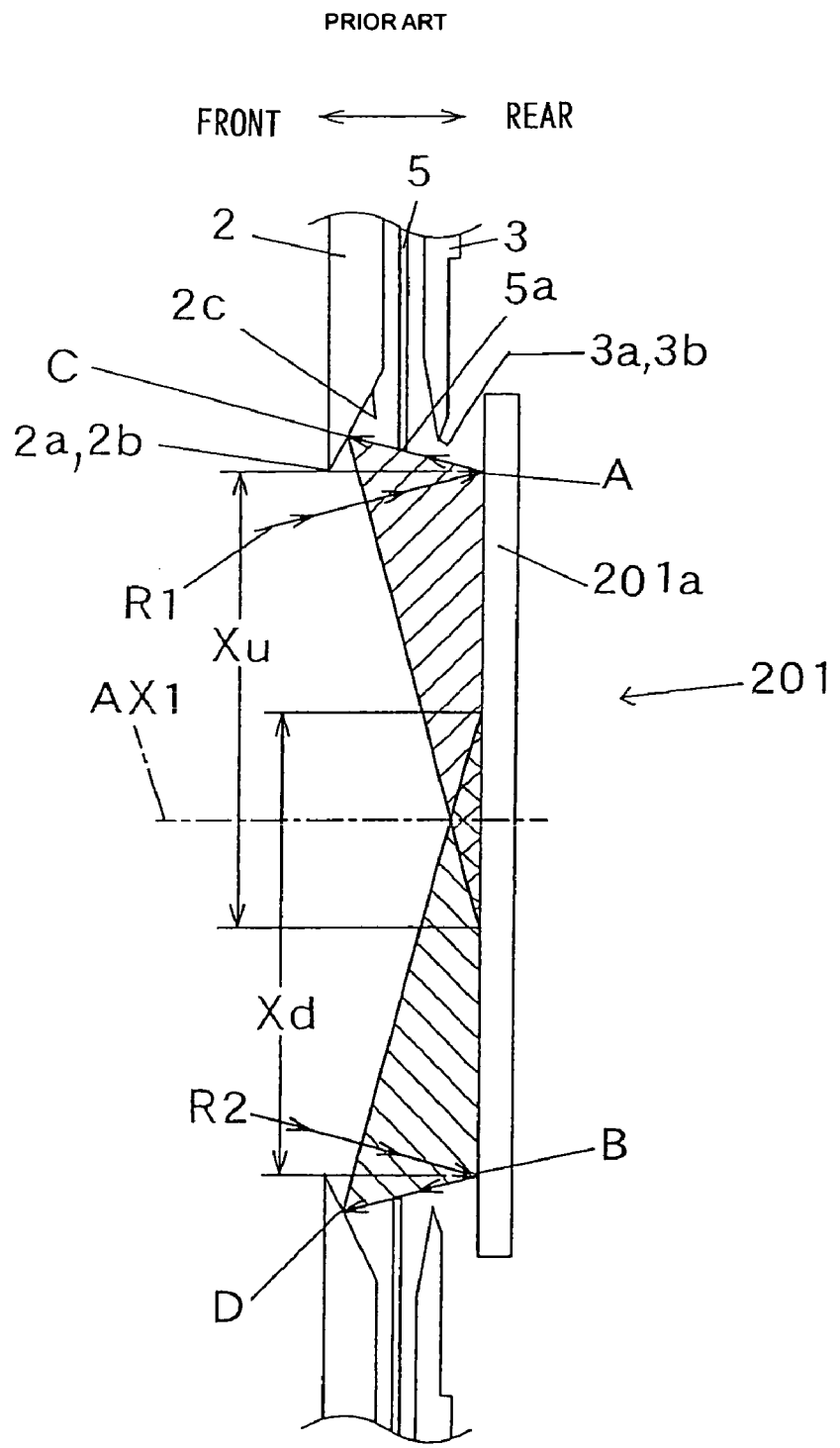
FIG. 3 is a sectional view of a focal plane shutter according to the prior art in which a thin plate 6 is not provided, and of the vicinity thereof, as seen from the side of the camera.

As described above, the base plate 2 and the rear cover 3 incorporated in this focal plane shutter 1 are made from a synthetic resin. Due to this, a portion of the incident light upon the surfaces of the base plate 2 and the rear cover 3 can easily be reflected from their surfaces (diffuse reflection). If this reflected light is incident upon the image sensor 100, there is a fear that it may deteriorate the picture quality of the captured image. In order to cope with this problem, in a prior art camera, as shown in FIG. 3, reflection of light by the edge surfaces of the photographic aperture 2a and the opening portion 3a of the rear cover 3 is prevented by forming the edges that define the photographic aperture 2a of the base plate 2 and the opening portion 3a of the rear cover 3 in the form of sharp edges. It should be understood that, for the sake of convenience, the shutter blade groups 8 and 9 are omitted in FIG. 3, and, in the filter 201, only the birefringent plate 201a that is positioned most towards the front is shown.

However, with such a prior art camera, as for example shown in FIG. 3, when incident rays R1 and R2 are reflected by spots A and B (portions A and B) on the surface of the birefringent plate 201a that is positioned directly after the focal plane shutter 1 and strike the sloping surfaces 2c, they are diffuse reflected by the spots C and D (the portions C and D) of the sloping surfaces 2c. Due to this, the light from these incident rays R1 and R2 reflected by the sloping surfaces 2c is incident upon the filter 201 over a wide range such as, for example, the ranges xu and xd shown in FIG. 3 by hatching, and exerts a bad influence upon image capture by the image sensor 100.

Figure 4:
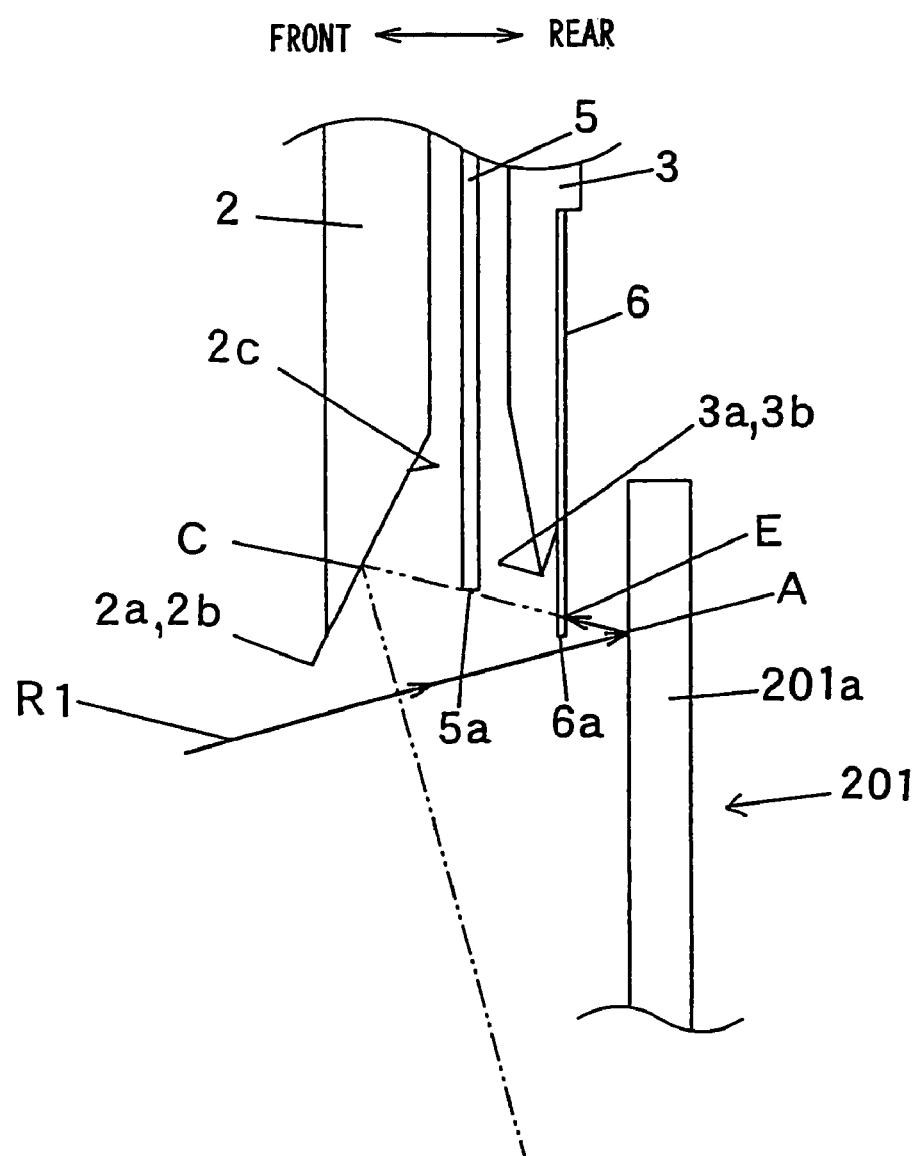
FIG. 4 is an enlarged cross sectional view of the focal plane shutter 1 and its vicinity, as seen from the side of the camera.

On the other hand, as described above, with the focal plane shutter 1 of this embodiment, by fitting the thin plate 6 upon the surface of which reflection prevention processing has been performed into the depressed portion 3c of the rear cover 3, as shown in FIG. 4, the incident ray R1 that is reflected by the portion A of the birefringent plate 201a and is proceeding towards the portion C of the sloping surface C is intercepted by this thin plate 6. In other words, the incident ray R1 that is reflected by the portion A of the birefringent plate 201a and is proceeding towards the portion C of the sloping surface 2c is intercepted by the portion E of the thin plate 6. Furthermore, since this incident ray R1 that strikes this portion E is absorbed by the portion E, accordingly it is not reflected for a second time towards the birefringent plate 201a. It should be understood that although, in FIG. 4, only the portion of the structure above the incident optical axis AX1 is shown, actually, in the same manner, for the incident ray R2 in the portion of the structure below the incident optical axis AX1, the incident ray R2 that is reflected by the portion B of the birefringent plate 201a and is proceeding towards the portion D of the sloping surface 2c is intercepted by the thin plate 6.

Figure 5:
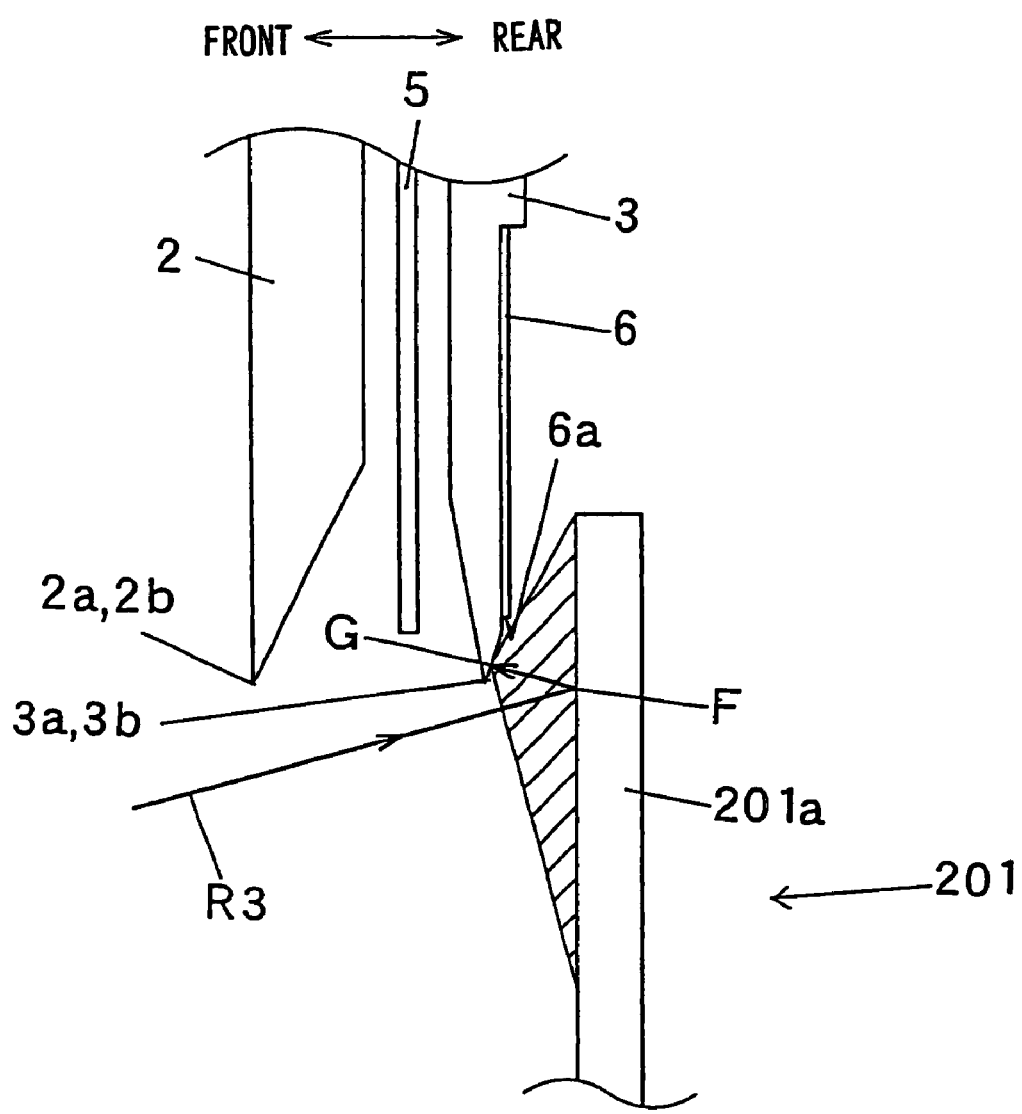
FIG. 5 is a figure showing an inappropriate example, for explanation of the appropriate position for an edge portion 3b.

As shown in FIGS. 2 and 4, with the focal plane shutter 1 of this embodiment, the edges of the opening portion 6a of the thin plate 6 project more towards the interior of the opening portion 3a of the rear cover 3 than do the edge portions 3b of that opening portion 3a. Suppose that conversely, as shown in FIG. 5, the edge portions 3b of the opening portion 3a of the rear cover 3 were to project more towards the interior of the opening portion 3a than did the edges of the opening portion 6a of the thin plate 6, then an incident ray R3 that was reflected by the portion F of the surface of the birefringent plate 201a would strike the rear surface of the rear cover 3, and would, for example, be diffuse reflected towards the filter 201 over a range such as that shown by the hatching. Accordingly, it is desirable for the edges of the opening portion 6a of the thin plate 6 to project, at least, more inwards of the opening portion 3a of the rear cover 3, than do the edge portions 3b of that opening portion 3a.

With the above described focal plane shutter 1 and digital still camera CA, the following beneficial operational effects are obtained.

(1) The thin plate 6, which is a reflection prevention member, is provided upon the rear surface of the rear cover 3. Since the light that strikes this thin plate 6 is not reflected by the thin plate 6, accordingly, by doing this, it is possible to prevent reflection of light, which would be harmful for the image capturing process. Moreover, since it is possible to prevent harmful reflected light from being incident upon the image sensor 100 by using this focal plane shutter 1 in the digital still camera CA, accordingly it is possible to enhance the picture quality of the captured images.

(2) The structure uses a thin plate made from metal (the thin plate 6), upon the surface of which reflection prevention processing has been performed, as a reflection prevention member that is fitted to the rear surface of the rear cover 3. From the point of view of preventing harmful reflected light, it is desirable to form the edge portions that project towards the photographic optical path along which the light flux from the photographic subject passes, like the edge portion 2b of the above described photographic aperture 2a, as sharp edges. Since the thickness of the thin plate 6 is extremely low, its edge portions yield an advantageous operational effect similar to that would be obtained by them being formed as sharp edges, and there is no fear that harmful reflected light will be engendered by the edge surfaces of the opening portion 6a. Furthermore, since the thin plate 6 is made from metal, accordingly it possesses sufficient strength even though it is extremely thin, and, when cleaning the surface of the filter 201 or the like, the chance that the user will deform or damage the thin plate 6 is low, even if undesirably he should touch it.

(3) Since the thin plate 6 is made from metal, accordingly it is simpler and easier to perform reflection prevention processing upon it by painting it with matte black paint or the like, as compared to the case if it were to be made from resin. Furthermore, since the adherence of paint to such a metal plate is good, accordingly the use of metal is excellent from the point of view of durability. It should be understood that, although in this embodiment it is necessary to provide the thin plate 6 separately from the rear cover 3, if the rear cover 3 were to be made as an all-metal plate, then, from the point of view of the shaping process for the rear cover 3, the manufacturing cost would become higher than in the case of this embodiment. Accordingly, with the focal plane shutter 1 and the digital still camera CA of this embodiment, it is possible to reduce the manufacturing cost.

(4) The structure is made so that the edges of the opening portion 6a of the thin plate 6 project more towards the interior of the opening portion 3a of the rear cover 3 than do the edge portions 3b of the rear cover 3. Due to this, it is possible to prevent harmful reflection of light that strikes the rear surface of the rear cover 3, and it is accordingly possible to enhance the picture quality of the captured images.

(5) The structure is made with the depressed portion 3c being provided upon the rear surface of the rear cover 3, and with the thin plate 6 being disposed in this depressed portion 3c. By doing this, it becomes possible to position the thin plate 6 in a simple and easy manner, so that it is possible to reduce the cost of manufacture. Moreover, since the thin plate 6 does not project to the rear of the rear cover 3, accordingly this contributes to making this focal plane shutter 1 compact. Furthermore, since it is not necessary to increase the distance between the focal plane shutter 1 and the filter 201, accordingly this contributes to making this digital still camera CA compact.

Figure 6A:
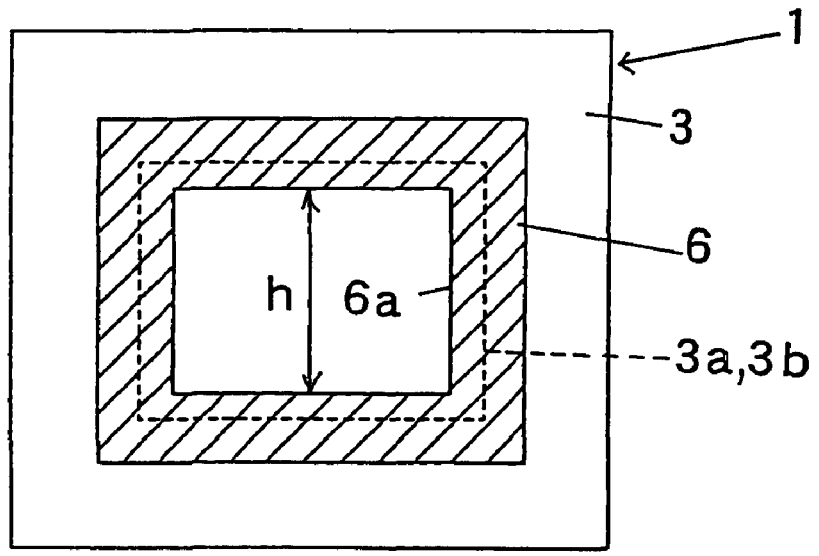
FIGS. 6A and 6B are figures showing a rear cover 3 as seen from the back, for explanation of the shape of the thin plate 6.
Figure 6B:
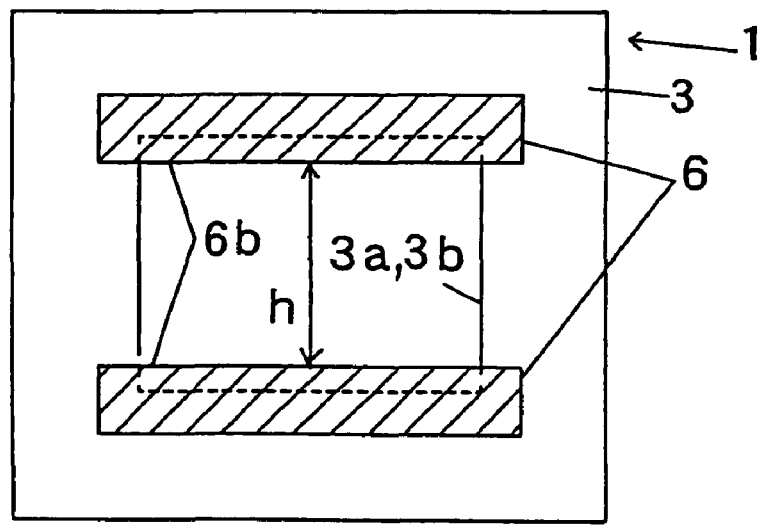

VARIANT EMBODIMENTS (1) Although, in the explanation provided above, as shown in FIG. 6A, the thin plate 6 was a thin plate made from metal having, in its center portion, the opening portion 6a that was made in an approximately rectangular shape, this is not to be considered as being limitative of the present invention. For example, as shown in FIG. 6B, it would also be acceptable to arrange to use thin strip shaped plate members for the thin plate 6, one along the upper edge of the opening portion 3a and one along its lower edge; in other words to dispose a total of two thin plates 6, one along each of the long sides of the opening portion 3a. It should be understood that the distance h between the long sides 6b that mutually face one another of these two thin plates 6 fitted to the rear cover 3 is equal to the height h of the opening portion 6a of the thin plate 6 described previously with reference to the first embodiment, and is also equal to the distance between the two opposing upper and lower edge portions 2b of the photographic aperture 2a.

As a result of experimental researches provided by the present inventor and others, it has been understood that even if, in this manner, no thin plate 6 is provided along the left and right edges (the short sides) of the opening portion 3a, nevertheless, by providing these thin plates 6 along the upper and lower edges (the long sides) of the opening portion 3a, it is still possible to obtain, to a sufficient extent, the beneficial effects of the present invention of preventing the above described harmful reflection of light. Accordingly, as shown in FIG. 6B, if at least the thin plates 6 are provided along the upper and lower edges (the long sides) of the opening portion 3a, a similar advantageous operational effect to that of the first embodiment is still obtained.

(2) Although, in the above explanation, the filter 201 was an infrared cut low pass filter of a four layer construction having, in order from the front, the birefringent plate 201a, the infrared rays cut-glass plate 201b, the phase plate 201c, and the birefringent plate 201d, this arrangement is only an example, and is not to be considered as being limitative of the present invention. In other words, the member at the frontmost surface of the filter 201 is not limited to being the birefringent plate 201; it would also be acceptable for it to be the infrared rays cut glass plate 201b or the like, or some other optical member. It should be understood that although, in the explanation provided above, the member that was positioned directly after the focal plane shutter 1 was the frontmost surface of the filter 201, this is not limitative of the present invention either; it would also be acceptable for the member that is positioned directly after the focal plane shutter 1 to be a cover glass of the image sensor 100, instead of the birefringent plate 201a of the filter 201.

(3) In the explanation provided above, with regard to the dimension of the thin plate 6, while the shape and the size of the opening portion 6a of the thin plate 6 were described as being approximately equal to the shape and the size of the photographic aperture 2a, no particular mention was made of the external shape or dimensions of the thin plate 6; but the following considerations are valid. If the incident rays that are reflected by the optical member that is positioned upon the frontmost surface of the filter 201 (for example, in the embodiment described above, the birefringent plate 201a) do not strike the rear surface of the cover 3, then it is possible to prevent the above described harmful reflected light from being incident upon the image sensor 100. Accordingly, it is desirable for the external shape of the thin plate 6 to be, at least, larger than the external shape of the optical member that is positioned upon the frontmost surface of the filter 201. It should be understood that, if the thin plate 6 is adhered into the depressed portion 3c by using adhesive or thin double sided adhesive tape, then, since it is necessary to make the area where the thin plate 6 and the depressed portion 3c overlap be a sufficiently large area for ensuring the strength of mutual adhesion of the thin plate 6 and the depressed portion 3c, accordingly it is necessary to determine the external shape of the thin plate 6 also from the point of view of ensuring that this area is sufficiently large.

(4) Although, in the explanation provided above, no particular mention was made of the qualities of the material from which the thin plate 6 is to be made (other than that it is to be made of metal), even though it is a very thin member, it is desirable for this thin plate 6 to be made from a material that is endowed with springiness, such as phosphor bronze or the like, so that, even if the user touches it with his finger during cleaning of the filter 201 or the like, it does not simply bend. It should be understood that, instead of using the thin plate 6, it is also possible to use a member that is made from some material other than metal, such as a resin plate or one made from a ceramic or the like, upon the surface of which reflection prevention processing has been performed. If a material other than metal is employed, then, since it may be considered that the thickness will not be as thin as compared to the case of using a thin plate 6 that is made from metal, accordingly, in this case, it is desirable to for the edges of the thin plate 6 that correspond to its opening portion 6a, or to its long sides 6b, in the form of sharp edges.

(5) Although, in the explanation provided above, an embodiment was described in which this focal plane shutter 1 was applied to a digital still camera CA, this is not to be considered as being limitative of the present invention. For example, it would also be acceptable to arrange to apply this focal plane shutter 1 to a digital camera that is capable of taking movies (moving images).

(6) It would also be acceptable to combine any or all of the above described embodiments and variant embodiments.

It should be understood that the present invention should not be considered as being limited by the particular features of the embodiments described above; it can be applied to a shutter device or an image-capturing device having any of various different structures, provided that it includes: a base plate that has a photographic aperture and a front surface and a rear surface; a shutter blade group that either closes the photographic aperture against light or opens it to light; a rear cover that has an opening portion corresponding to the photographic aperture, is fitted to the rear surface of the base plate with the shutter blade group between them, and has a front surface and a rear surface; and a reflection prevention member that is fitted to the rear surface of the rear cover.

The above described embodiments are examples, and various modifications can be made without departing from the scope of the invention.

What is claimed is:

1. A shutter device, comprising:
   a base plate having a photographic aperture and a front surface and a rear surface;
      a shutter blade group that closes and opens the photographic aperture to light;
      a rear cover provided closer to a photographic subject than an image sensor, having an opening portion that corresponds to the photographic aperture, provided to the rear surface of the base plate with the shutter blade group between the rear cover and the rear surface of the base plate, and having a front surface and a rear surface; and
      a reflection prevention member is non-movably fixed to the rear surface of the rear cover, a surface of the reflection prevention member that faces toward the image sensor, having been subjected to reflection prevention processing, so that reflected light from a side of the image sensor is prevented from being incident upon the image sensor.

2. A shutter device according to claim 1, wherein:
   the reflection prevention member is a thin plate made from metal.

3. A shutter device according to claim 1, wherein:

the opening portion is formed in an approximately rectangular shape; and the reflection prevention member is fixed, at least, to long sides of the opening portion.

4. A shutter device according to claim 3, wherein:

the opening portion is a larger aperture than the photographic aperture; and edges of the reflection prevention member project to the interior of the opening portion, so as to define an aperture that is smaller than the aperture of the opening portion.

5. A shutter device according to claim 1, wherein:

a concave portion is provided upon the rear surface of the rear cover, and is formed as more concave towards the front surface of the rear cover than a surrounding portion of the rear surface of the rear cover; and the reflection prevention member is fixed in the concave portion.

6. An image-capturing device, comprising:

an image sensor;

a base plate provided in front of the image sensor, provided closer to a photographic subject than the image sensor, and having a photographic aperture through which light from the photographic subject passes towards the image sensor;

a shutter blade group that closes and opens the photographic aperture to light;

a rear cover having an opening portion that corresponds to the photographic aperture, provided to a surface of the base plate on a side of the image sensor; and reflection prevention member that is non-movably fixed to a surface of the rear cover on a side facing the image sensor, and having a surface facing toward the image sensor, which has been subjected to reflection prevention processing, so that reflected light from a side of the image sensor is prevented from being incident upon the image sensor.

7. An image-capturing device, comprising:

an image sensor;

a base plate in front of the image sensor and having an aperture through which light from a photographic subject passes as it travels to the image sensor;

a shutter that opens and closes the aperture to light;

a rear cover having an opening portion that corresponds to the aperture provided to a surface of the base plate on the side of the image sensor, the rear cover having a reflection prevention member non-movably fixed on a surface of the rear cover, the surface of the reflection prevention member that faces toward the image sensor being such that reflected light from the side of the image sensor is prevented from being incident upon the image sensor.

* * * * *